United States Patent [19]
Best

[11] Patent Number: 5,886,685
[45] Date of Patent: Mar. 23, 1999

[54] FOOT OPERATED COMPUTER MOUSE ADAPTOR

[76] Inventor: Eddie L. Best, 2434 Zagreb Ave., Pacific, Mo. 63069

[21] Appl. No.: 826,955

[22] Filed: Apr. 8, 1997

[51] Int. Cl.[6] ................................................. G09G 5/08
[52] U.S. Cl. .......................... 345/163; 345/156; 345/157; 400/475; 463/36
[58] Field of Search ..................................... 345/156, 157, 345/164, 163; 463/36; 400/475

[56] References Cited

U.S. PATENT DOCUMENTS

| | | |
|---|---|---|
| 4,771,394 | 9/1988 | Cavanagh . |
| 5,139,261 | 8/1992 | Openiano . |
| 5,148,152 | 9/1992 | Stueckle et al. . |
| 5,334,997 | 8/1994 | Scallon . |
| 5,367,315 | 11/1994 | Pan . |
| 5,431,569 | 7/1995 | Kelly et al. . |

FOREIGN PATENT DOCUMENTS

| | | |
|---|---|---|
| 2692386 | 12/1993 | France . |
| 4035273 | 7/1992 | Germany . |
| 9-114583 | 5/1997 | Japan . |
| 95/34872 | 12/1995 | WIPO . |

Primary Examiner—Jeffery A. Hofsass
Assistant Examiner—Julie Lieu
Attorney, Agent, or Firm—Kevin L. Klug

[57] ABSTRACT

A foot operated computer mouse adaptor for operating a conventional computer mouse with a computer user's foot having a cavity into which the computer mouse fits and a means to removably attach the computer user's foot onto the housing. The foot operated computer mouse adaptor allows a computer user to use a conventional computer mouse via the movement of the user's foot on any substantially flat surface.

16 Claims, 14 Drawing Sheets

FOOT OPERATED COMPUTER MOUSE ADAPTOR

BACKGROUND OF THE INVENTION

The present invention relates in general to an adaptor for a computer mouse and pertains, more particularly, to a computer mouse adaptor which allows a conventional computer mouse to be operated with the foot instead of the hand. In addition to its many benefits, the unique features of the present invention allow persons with physical impairments of the hand to operate a conventional computer mouse with one of their feet. The present invention also allows a computer user to keep both hands on the home row of the keyboard and still position the mouse by using one of their feet.

The mouse is an effective tool for movement and positioning on the computer screen, but poses a problem to fast data-entry. With most conventional computer mice, the computer cursor is moved by moving the computer mouse with the hand while the mouse is positioned on a table or desk. This forces the computer user to physically remove a hand from the keyboard and reach for and position the mouse. This is a hindrance to quick data-entry. Devices which currently allow control of mouse functions via the computer user's feet are of a specialty nature and do not provide for the use of a conventional computer mouse as provided with most personal computers. The current devices which allow foot control of mouse functions thereby necessitate a substantial investment on the part of the computer user in order to implement typical mouse movement via foot movement. The present invention provides an adaptor which allows for foot control of the mouse yet is of such a nature that it would be of minimal cost to the computer user.

Other prior art devices similar to a conventional mouse, include the joystick, touchpad, and wireless mouse. All of these devices force the user to remove at least one hand from the keyboard. The present invention will allow a computer user to keep both hands on the home row of the keyboard and still be able to position the cursor by using a foot attached to the mouse adaptor. The present invention also allows the computer user to quickly and easily switch between foot control and hand control without disconnecting the computer mouse from the computer.

Accordingly, it is an object of the present invention to provide a foot operated computer mouse adaptor which easily allows a conventional computer mouse to be used with a left or right foot of the computer user and thereby speed data entry or provide easier computer operation for those persons with impaired hand function.

Another object of the present invention is to provide a foot operated computer mouse adaptor which allows for easy installation, removal and use of a conventional computer mouse without the use of specialty tools or modification of the conventional computer mouse.

Still another object of the present invention is to provide a foot operated computer mouse adaptor which is of sufficient strength that it can withstand the weight of a person without breakage and without adversely affecting the computer mouse.

A still further object of the present invention is to provide a foot operated computer mouse adaptor which easily attaches and releases to any size foot whether or not the user's shoe is on.

SUMMARY OF THE INVENTION

To accomplish the foregoing and other objects of this invention there is provided a foot operated computer mouse adaptor into which is mounted a conventional computer mouse. The foot operated computer mouse adaptor in its most basic form is comprised of a housing which is contoured for the placement of a foot, one or more straps which hold the adaptor to the foot, and a foam insert which is placed within a cavity within the housing and used to position and snugly hold the mouse.

In a preferred embodiment, the housing has a rectangular cavity in its most bottom portion of a width, height and length that will accommodate the dimensions of a typical computer mouse. The housing also has a recessed channel from the cavity to the frontmost portion of the housing in order to accommodate the mouse cord. The outside length and width of the adaptor is of such a size that a human foot will rest comfortably onto the top surface.

In a preferred embodiment, the foot is held to the top of the housing with two straps. The straps attach via pegs which extend from the housing on its exterior sides. The straps are of a sufficiently elastic nature that they may be extended over the foot, with or without a shoe, and secured to the pegs on each side of the housing. The straps contain a plurality of holes, much like a belt, which allow for them to be secured to the pegs. This secures the foot to the housing thereby allowing the housing to move in conjunction with the foot.

To assemble the preferred embodiment, the computer user places at least one foam insert around the mouse except for the portion which defines the base of the mouse. The mouse and foam combination is then placed within the cavity of the housing and pushed snugly in place with the base portion of the mouse facing out. The foam insert causes the mouse to be securely held within the cavity and also ensures accommodation of the length and width of various mouse sizes. It is important to note that a foam insert may be required within the cavity as a spacer before the mouse with its foam insert is placed within the cavity. This ensures a proper fit of the mouse height with the cavity height. After proper insertion is achieved, the base of the mouse should be flush with the base of the housing with only the rollerball of the mouse extending from the base, if the mouse is equipped with a rollerball, and the mouse cord should extend from the cavity through the recessed channel to the computer. One advantage of using the foam to hold the mouse is that the mouse may be easily removed should the user wish to use the mouse by hand.

Once the mouse is inserted and held within the housing, the computer user places a foot onto the topmost portion of the housing and pulls the straps over the shoe or foot. The straps are initially held on one side via the pegs and then pulled over the foot and secured to the pegs on the other side. At this point of assembly, the housing along with the mouse is held securely to the foot and may be used on any flat surface.

In alternative embodiments, the housing may have set screws within the top of the cavity to adjust the height of the mouse. An alternative embodiment may also have set screws on the sides of the cavity to hold the mouse firmly in place. Other alternative embodiments may also have thin straps on the bottom of the housing to help secure the mouse within the cavity. Still other alternative embodiments may contain flexible keepers on the sides of the cavity that will push over the edges of the base of the mouse in order to secure it into the cavity. Further alternative embodiments may also use a sticky tape or adhesive to hold the mouse within the cavity.

The housing is manufacturable from different materials and in different sizes and colors. Usable materials include plastic, wood, metal, fiberglass and composites. In one preferred embodiment, the housing is comprised of a polymer-type material. The straps are also manufacturable from different materials and in different sizes and colors. Usable materials include plastic, leather, rubber, metal, cloth or any slightly elastic material. In one preferred embodiment, the straps are comprised of an elastic cloth type material.

BRIEF DESCRIPTION OF THE DRAWINGS

Numerous other objects, features and advantages of the invention should now become apparent upon a reading of the following detailed description taken in conjunction with the accompanying drawings, in which.

DETAILED DESCRIPTION

Figure 1:
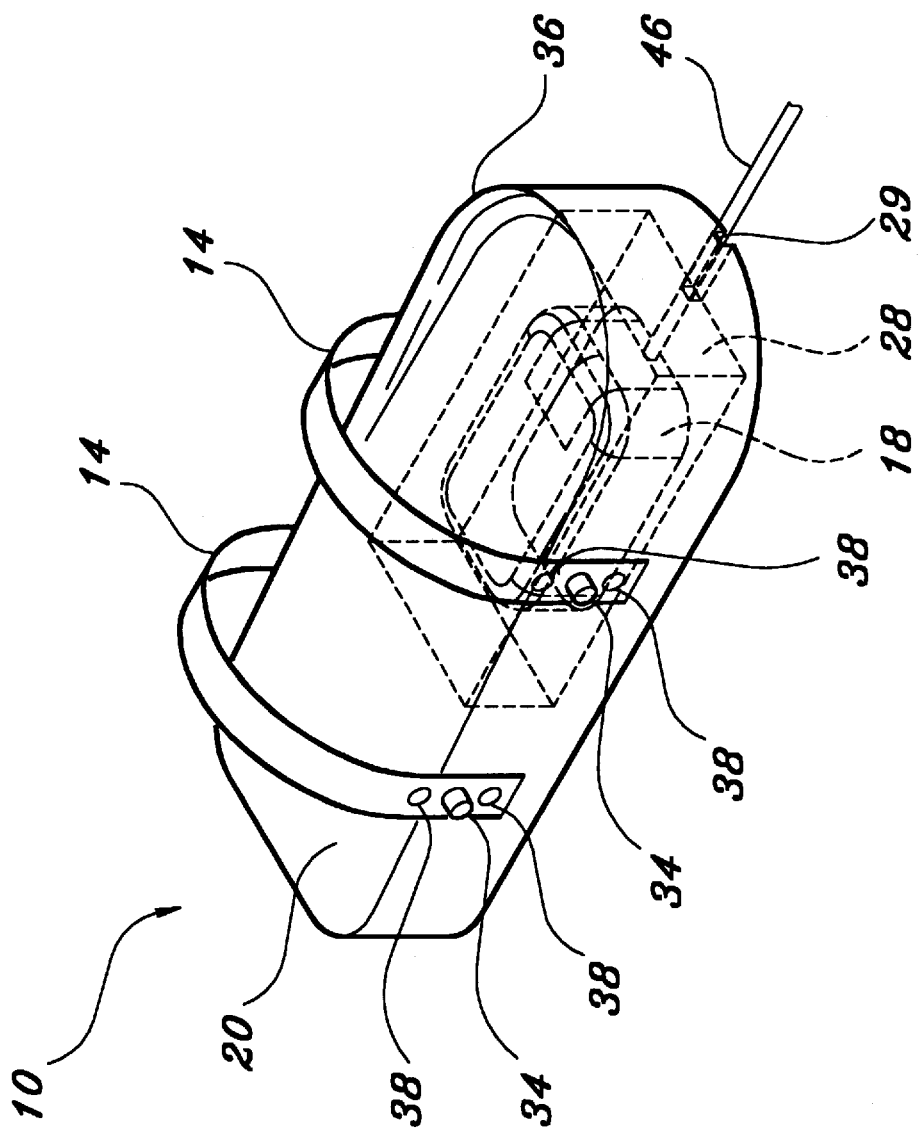
FIG. 1 is a top surface perspective view of a preferred embodiment of a foot operated computer mouse adaptor with a mouse installed within its cavity.
Figure 2:
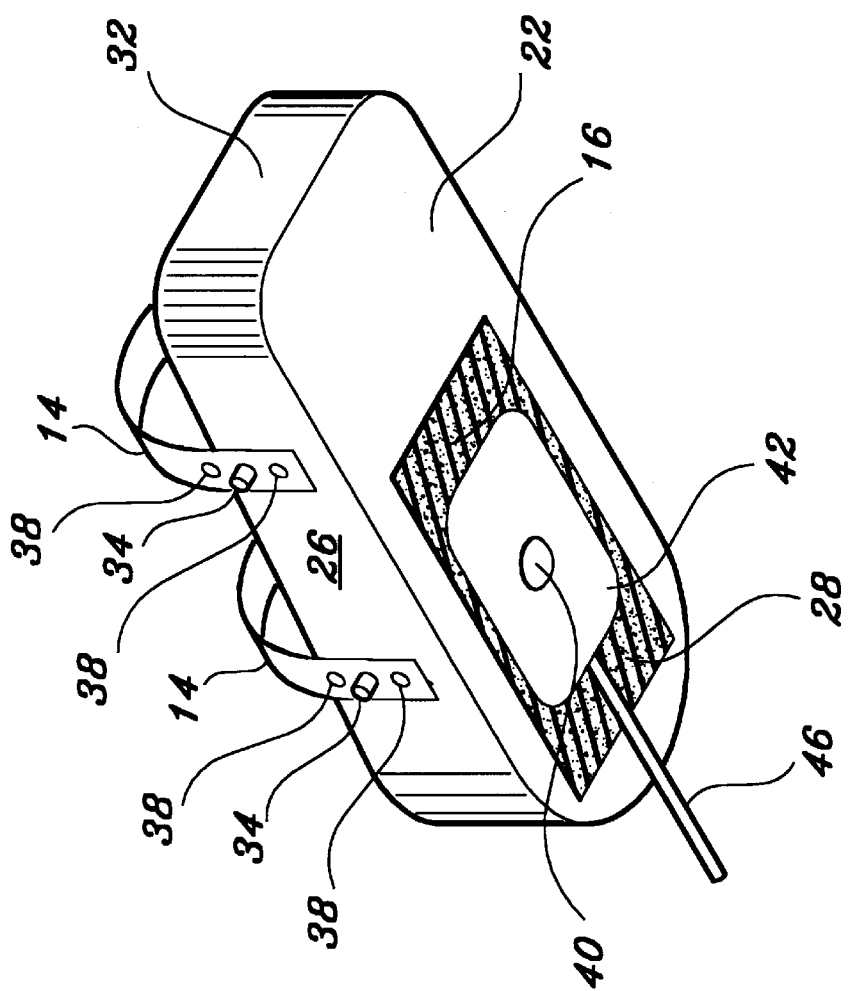
FIG. 2 is a bottom surface perspective view of the preferred embodiment of a foot operated computer mouse adaptor with a mouse and foam installed within its cavity.
Figure 3:
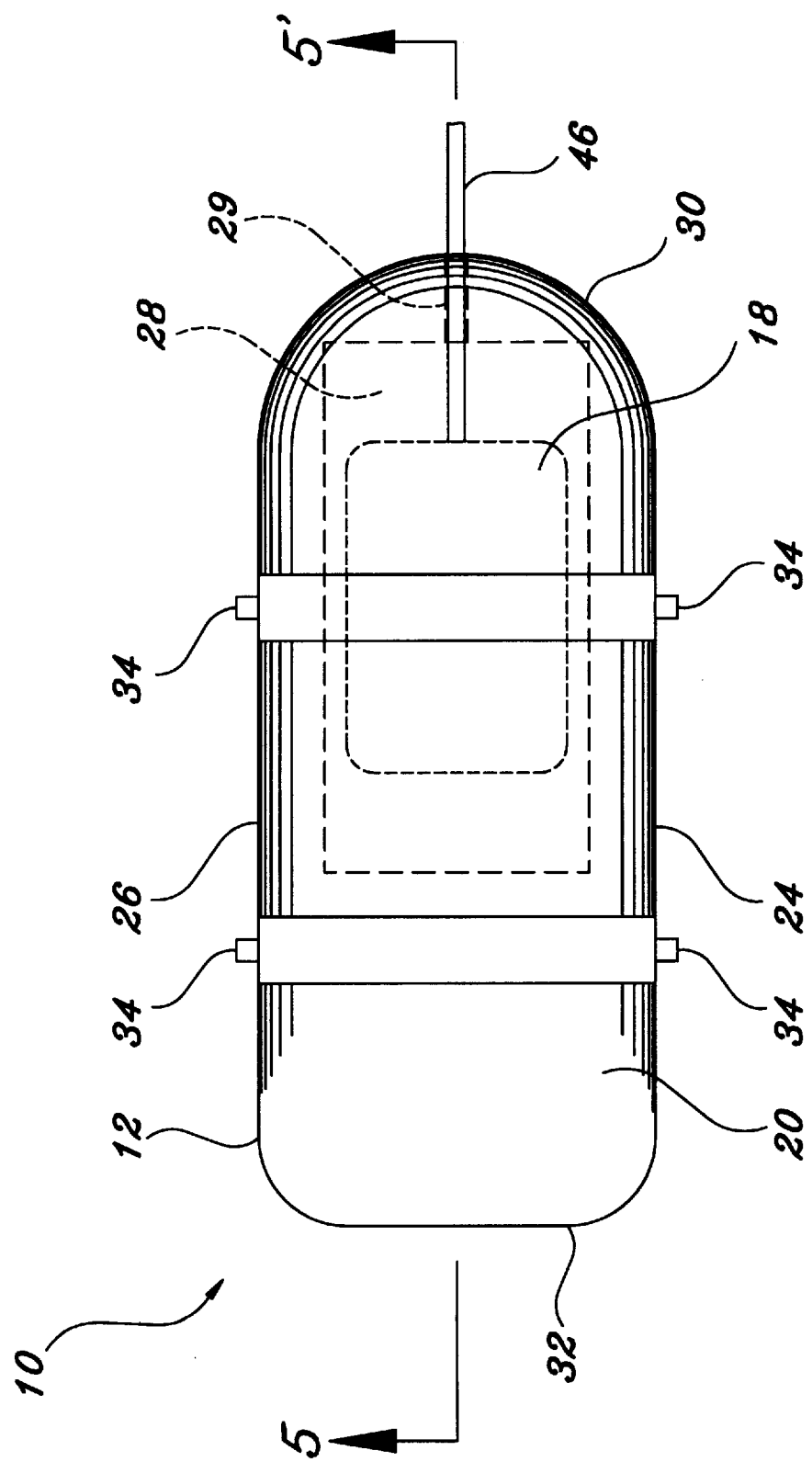
FIG. 3 is a top plan view of a preferred embodiment of a foot operated computer mouse adaptor with a mouse installed within its cavity.
Figure 4:
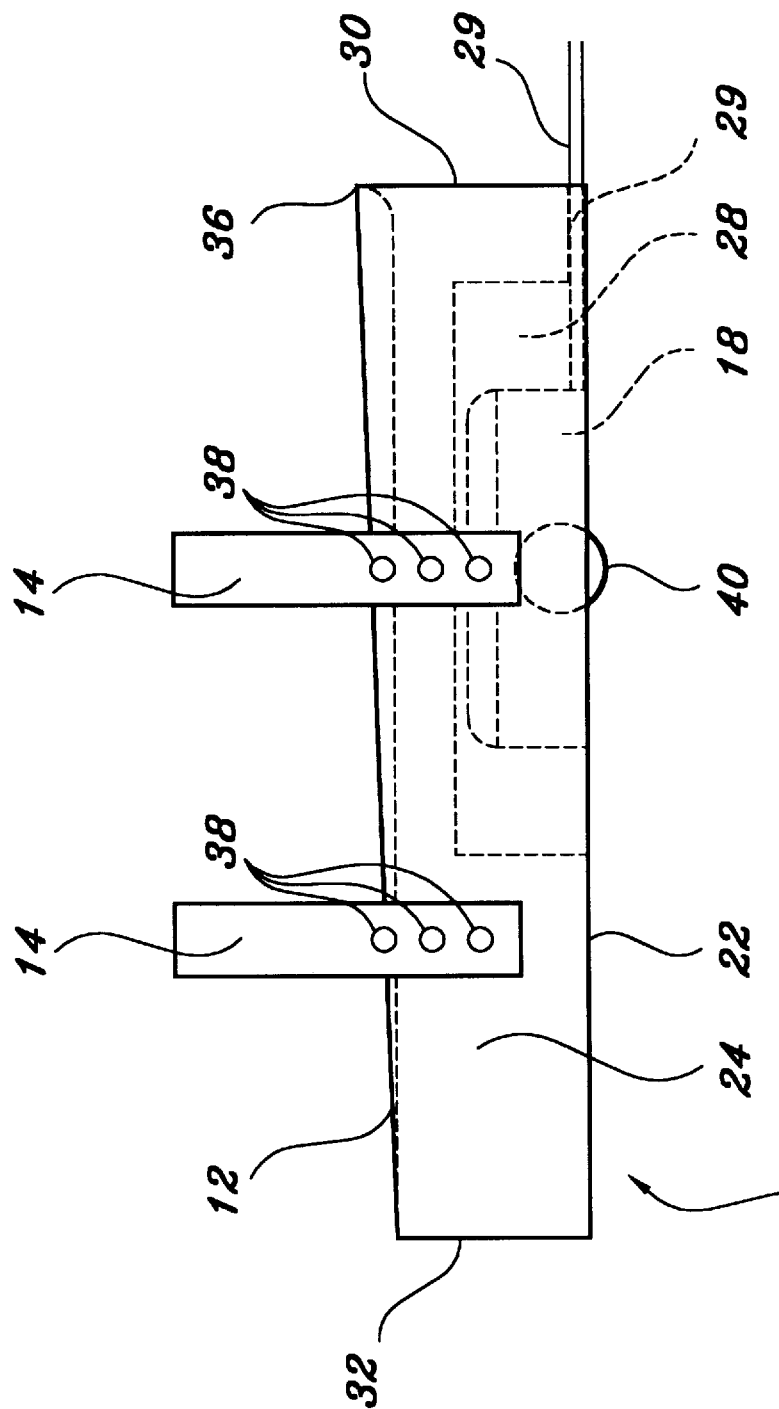
FIG. 4 is a right side plan view of a preferred embodiment of a foot operated computer mouse adaptor with a mouse installed within its cavity.
Figure 5:
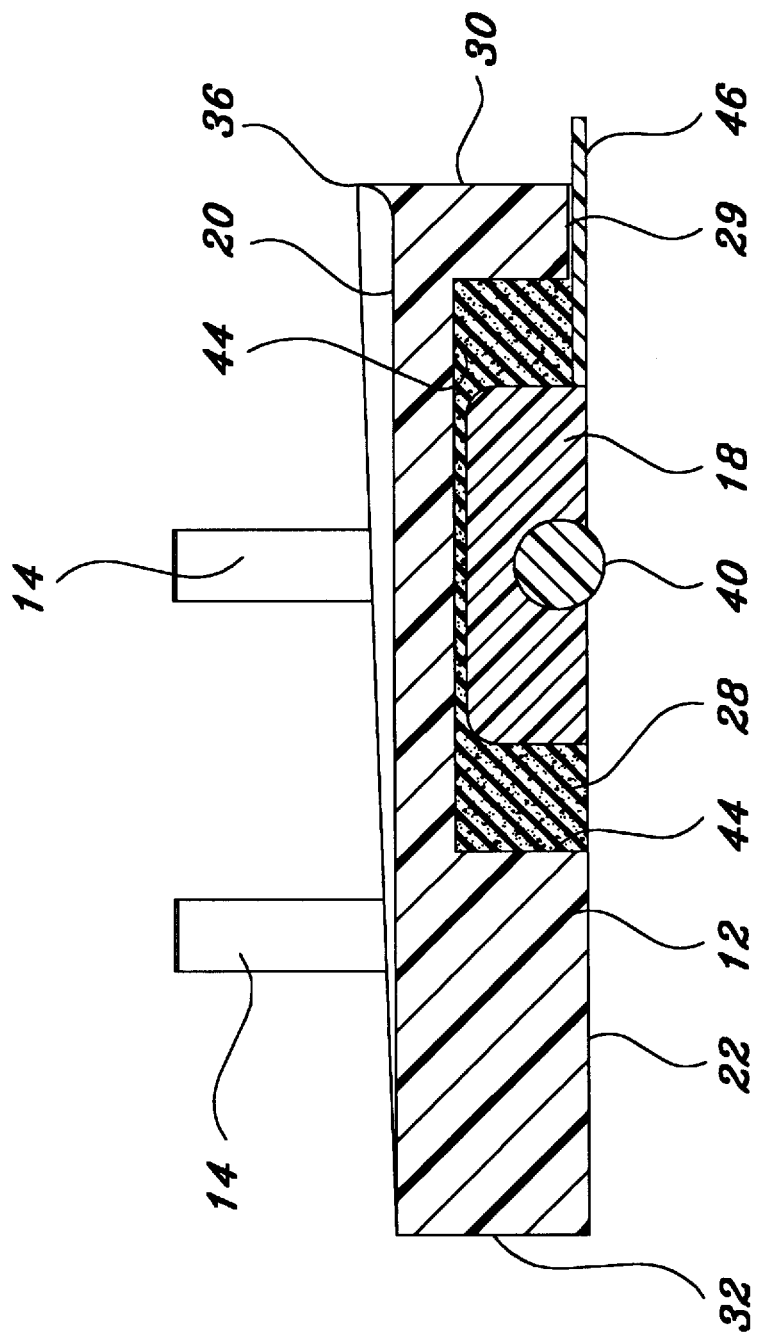
FIG. 5 is a cross section view taken along cut line 5—5' of FIG. 3 of a preferred embodiment of a foot operated computer mouse adaptor with a mouse and foam installed within its cavity.
Figure 6:
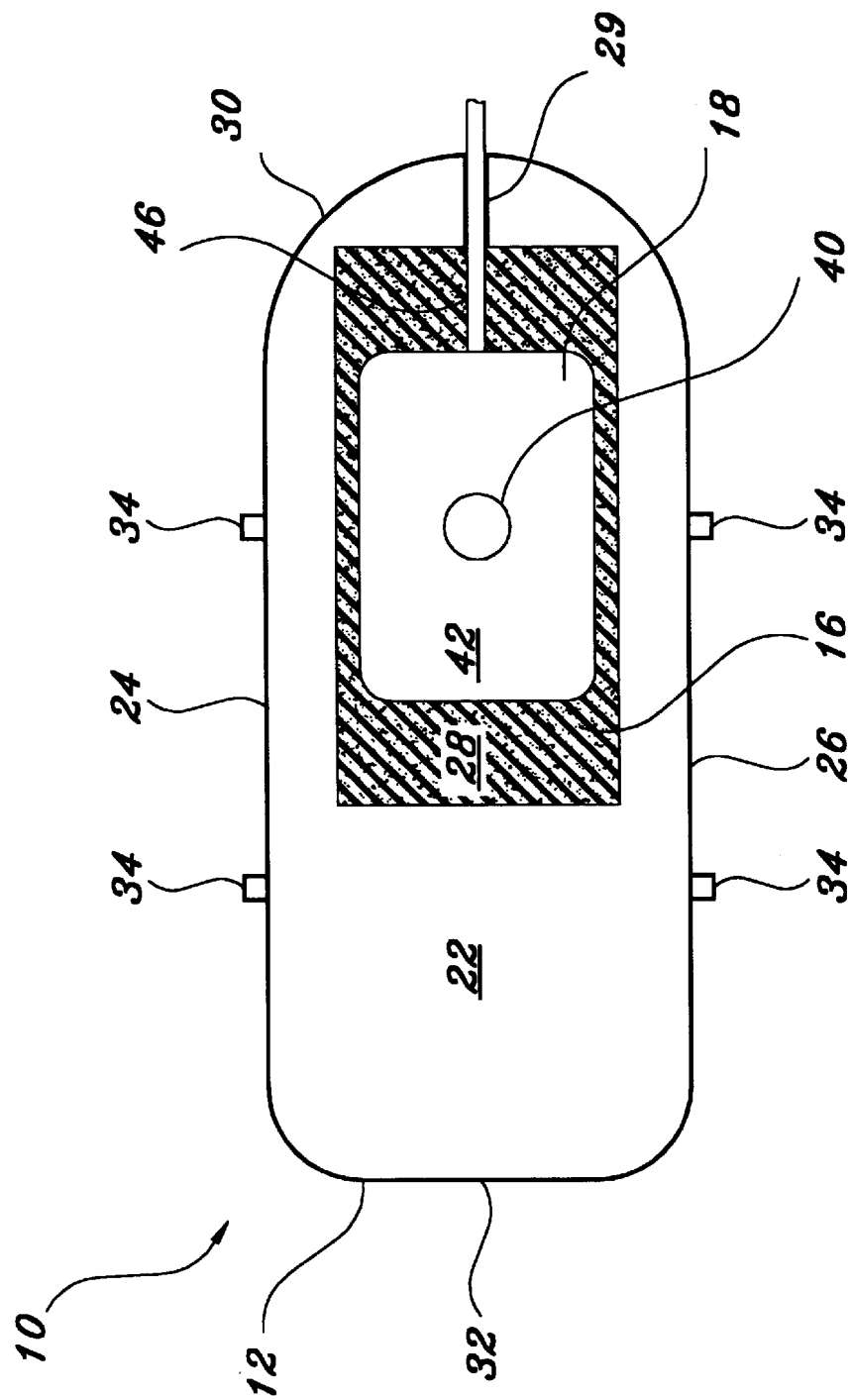
FIG. 6 is a bottom plan view of a preferred embodiment of a foot operated computer mouse adaptor with a mouse and foam installed within its cavity.
Figure 7:
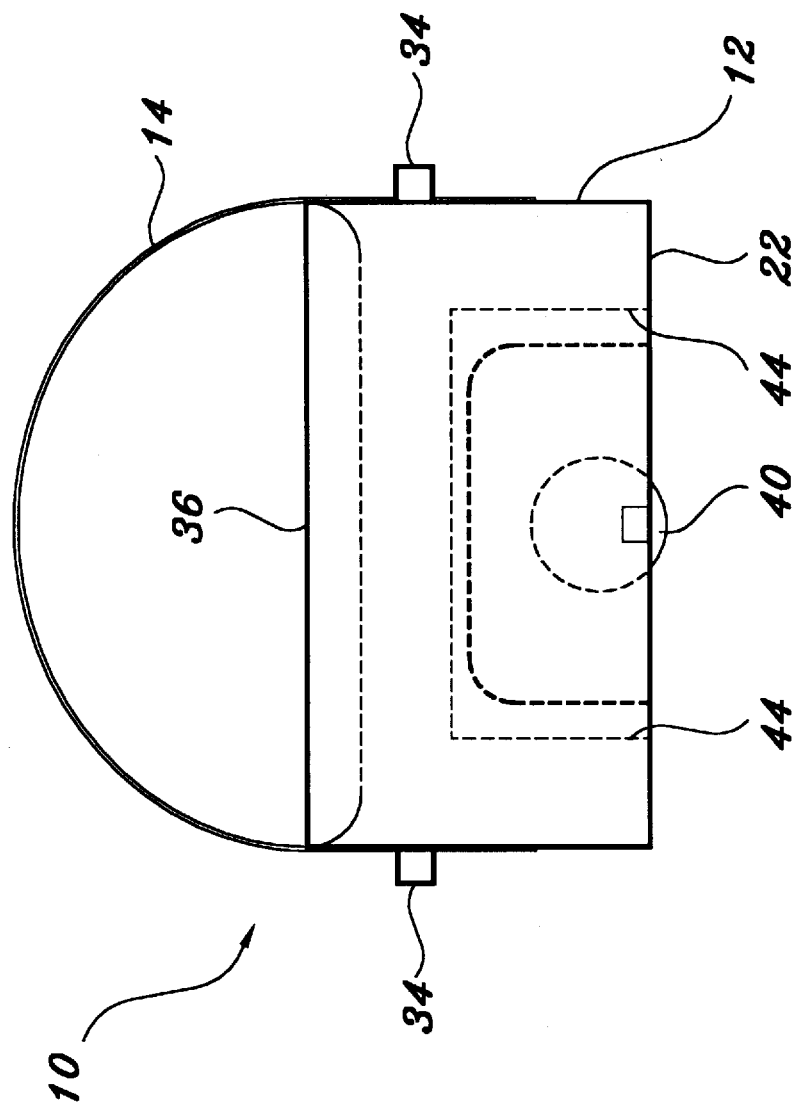
FIG. 7 is a front plan view of a preferred embodiment of a foot operated computer mouse adaptor with a mouse installed within its cavity.

Referring now to the drawings there is shown a preferred embodiment in FIGS. 1–7 of a foot operated computer mouse adaptor. The foot operated computer mouse adaptor is described in connection with a computer mouse, a computer user's foot and a computer.

In the preferred embodiment, the foot operated computer mouse adaptor 10 comprises a housing 12, one or more top straps 14 and one or more foam inserts 16. The housing 10 is capable of retaining and holding the top straps 14, the foam insert 16 and a computer mouse 18.

The housing 12 has a top surface 20, a bottom surface 22, a right side 24, a left side 26, a cavity 28, a front 30, a back 32, a recessed channel 29 which extends from the cavity 28 to the front 30, and a series of pegs 34 mounted onto the right side 24 and the left side 26. The housing cavity 28 is of sufficient length, width and depth to accommodate and surround a conventional computer mouse. The top surface 20 contains a lip 36 which substantially surrounds the top surface 20 in order to ensure that a computer user's foot does not significantly slide on the top surface 20 while the foot operated computer mouse adaptor 10 is in use. That is, the lip 36 forms the necessary contour on the top surface 20 to place and hold a foot properly. In the preferred embodiment, there are two pegs 34 integrally mounted on the left side 26 and two pegs 34 integrally mounted on the right side 24 of the housing 12 for attachment of the top straps 14. In a preferred embodiment, they are positioned so that two top straps 14 may be positioned across the computer user's foot, one towards the front of the foot and one towards the rear of the foot. The bottom surface 22 is substantially flat in form that it may slide across a flat surface while the computer mouse 18 is contained within the cavity 28.

In the preferred embodiment, two top straps 14 are provided which have a plurality of holes 38 along each. The holes 38 function much like the holes within a belt. That is, the top straps 14 secure the computer user's foot to the housing 12 by strapping over the topmost portion of the computer user's foot. Once strapped over the computer user's foot, the straps are secured via placing a hole 38 within the strap 14 over a peg 34 on the right side 24 and then repeating the process with a peg 34 on the left side 26. The elastic nature of the top straps 14 allow them to be slightly stretched that a hole 38 may align with a peg 34. Alternative embodiments may incorporate straps which are elastic in nature and surround the housing 12, the computer user's foot, and the top surface 20 of the housing 12.

One or more foam inserts 16 are provided for proper positioning and secure holding of the computer mouse 18 within the cavity 28. That is, in order to position the computer mouse 18 flush with the bottom surface 22 of the housing 12 and ensure that the rollerball 40, if so equipped, extends from the bottom surface 22, one or more foam inserts 16 may be required as spacers within the cavity 28. Once the proper number of foam inserts 16 are placed into the cavity 28 as spacers, another foam insert 16 is placed over and around the computer mouse 18. This foam insert 16 covers substantially all of the computer mouse 18 except for the base 42 where the rollerball 40, if so equipped, is located. Once covered, the mouse 18 is pushed into the cavity 28 and held in place via the compaction of the foam insert 16 between the cavity walls 44 and the mouse 18 thereby forming a frictional contact and hold. The foam insert 16 ensures that the computer mouse 18 is not damaged while installed in the housing 12 and allows the computer user to easily remove the mouse 18 if necessary.

Assembly of the foot operated computer mouse adaptor 10 first requires the placement of the proper number of foam inserts 16 and the computer mouse 18 into the cavity 28 as previously described. The mouse cord 46 is then extended from the cavity through the recessed channel 29 of the housing 12 and connected to the user's computer. The housing 12 is then placed on a flat surface with the bottom surface 22 of the housing 12 touching said flat surface and is ready for use.

To use the foot operated computer mouse adaptor 10, the computer user places his or her foot on the top surface 20 of the housing 12 and engages the top straps 14 onto the pegs 34 as previously described. This ensures that the computer user's foot is securely attached to the foot operated computer mouse adaptor 10. At this point, the computer user may freely move his or her foot on the flat surface in order to position the cursor or any other entity on the computer screen which is dependant on mouse movement. Since most computer operating systems allow for the computer user to use the keyboard as a replacement for the buttons on the mouse 18, the user will be able to substitute the proper keyboard keys for the mouse clicks. An example of using the keyboard keys as a substitute for the buttons on the mouse 18 is the Mousekey feature of Windows 95®. This feature allows the computer user to use the numeric keyboard "/" key for the left mouse button, the "31 " key for the right mouse button, and the "+" key for a double click.

The foot operated computer mouse adaptor 10 can be comprised of a variety of materials. The housing 12 is manufacturable from materials ranging from plastic, wood, metal, fiberglass and composites. In the preferred embodiment, the housing 12 is comprised of a polymer-type material. The top straps 14 are also manufacturable from different materials such as plastic, leather, rubber, metal, cloth or any elastic material. In the preferred embodiment, the top straps 14 are comprised of an elastic cloth type material.

Figure 8:
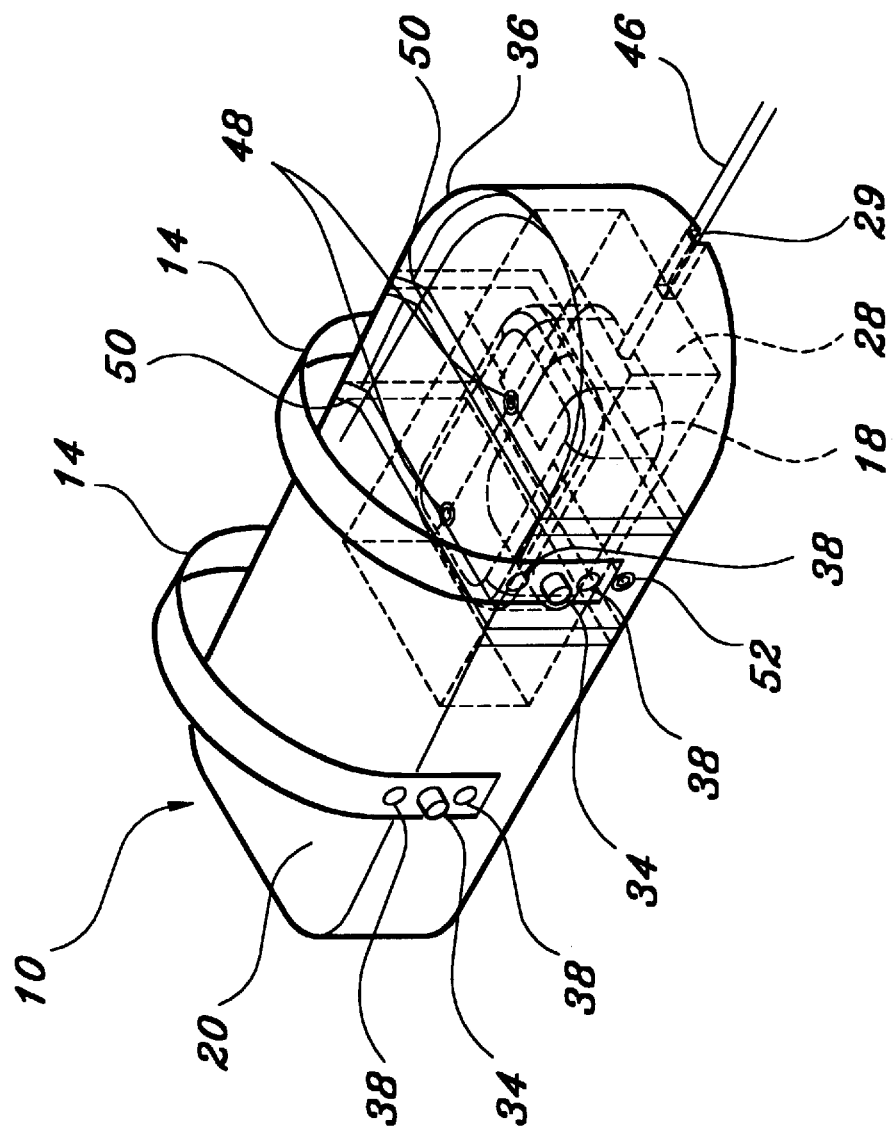
FIG. 8 is a top surface perspective view of an alternate embodiment of a foot operated computer mouse adaptor with a mouse installed within its cavity.
Figure 9:
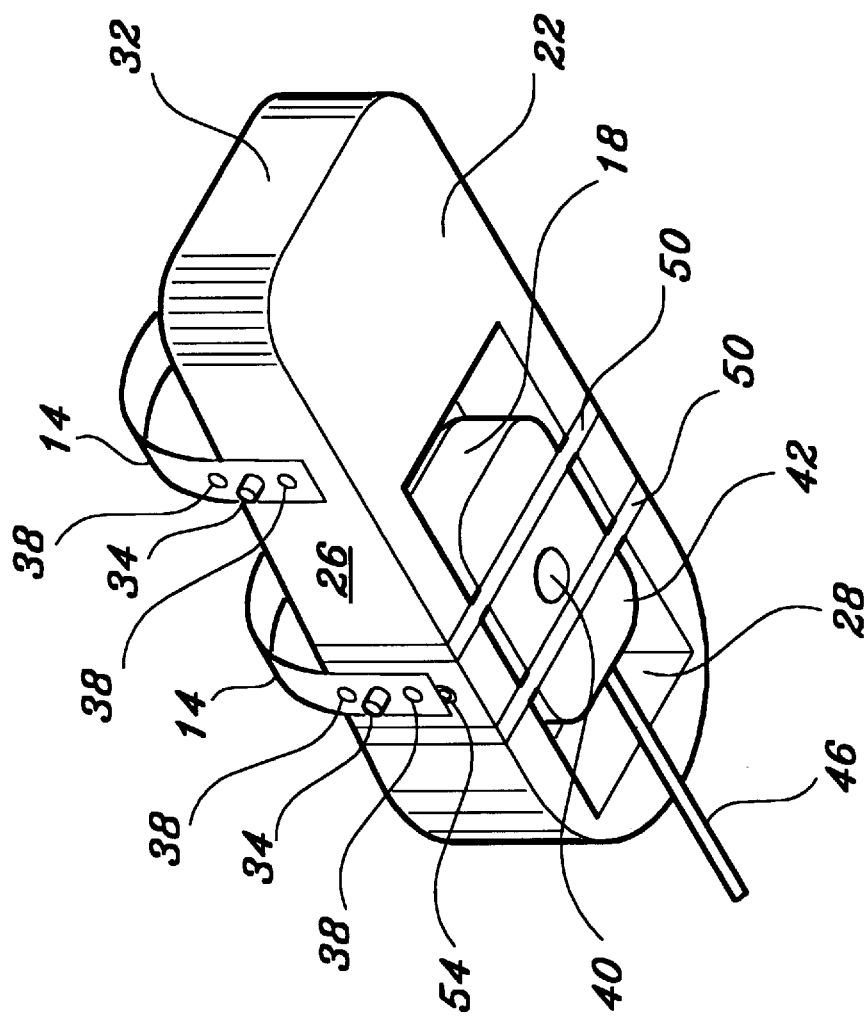
FIG. 9 is a bottom surface perspective view of an alternate embodiment of a foot operated computer mouse adaptor with a mouse installed within its cavity.
Figure 10:
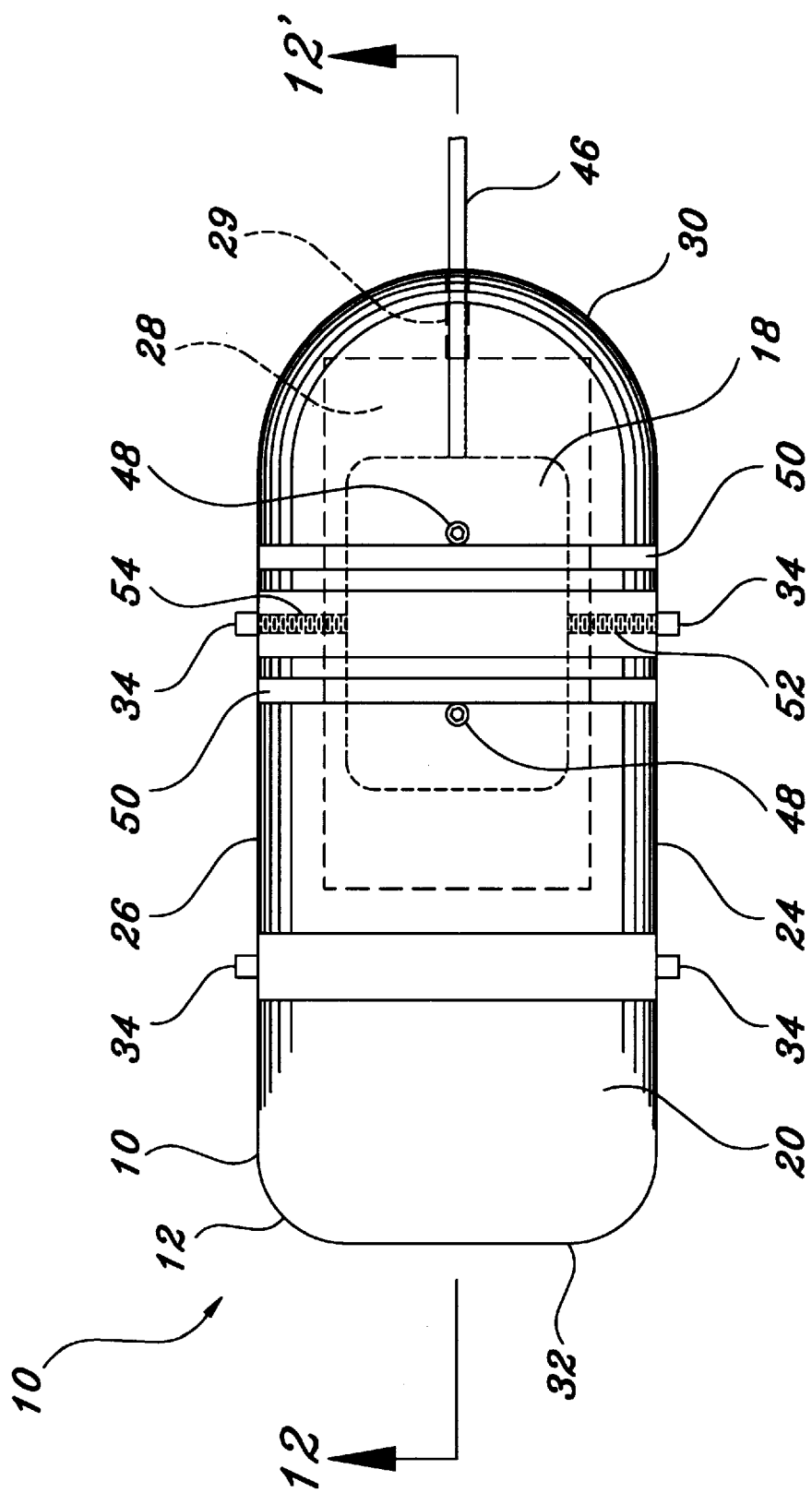
FIG. 10 is a top plan view of an alternate embodiment of a foot operated computer mouse adaptor with the mouse installed within its cavity.
Figure 11:
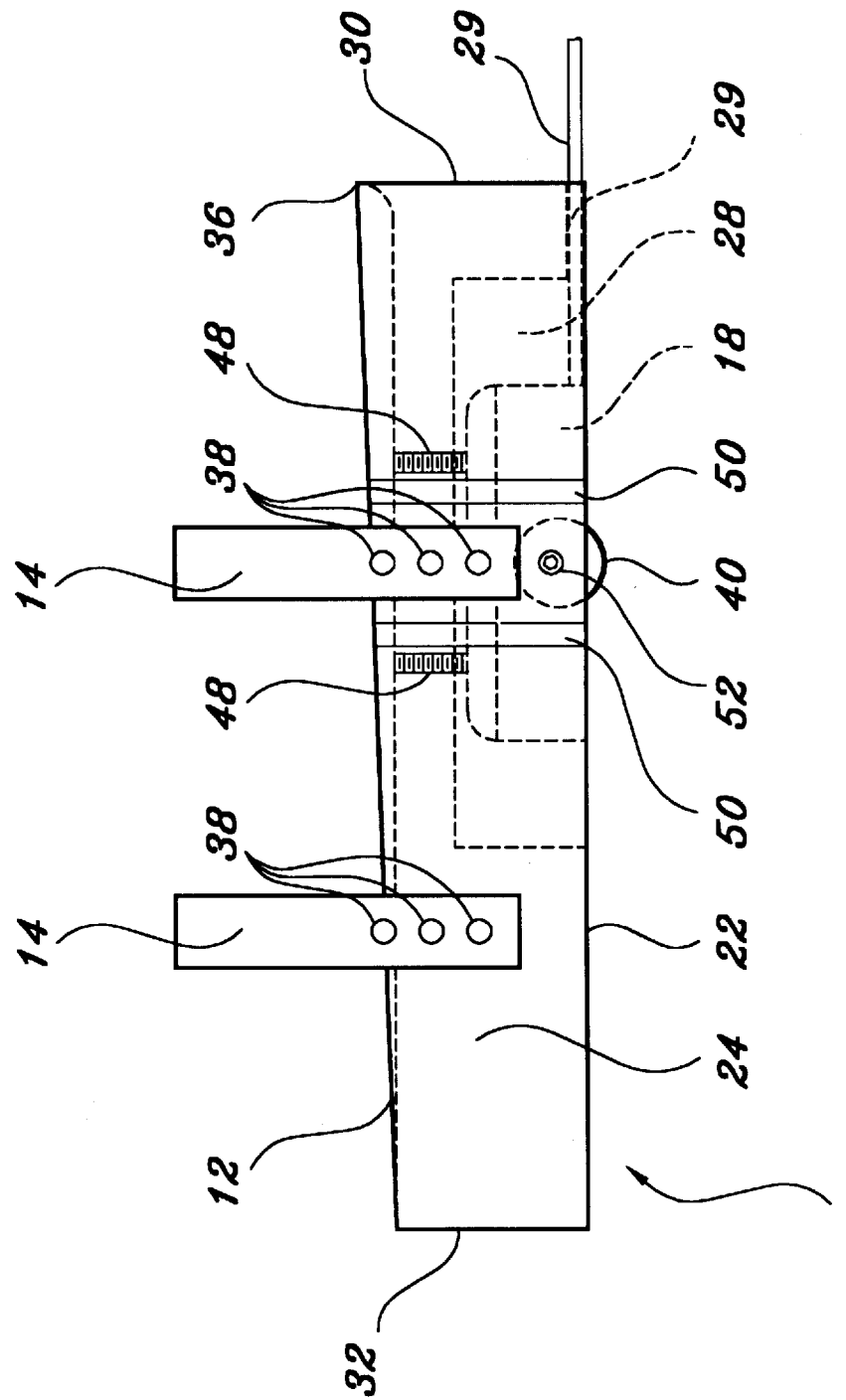
FIG. 11 is a right side plan view of an alternate embodiment of a foot operated computer mouse adaptor with a mouse installed within its
Figure 12:
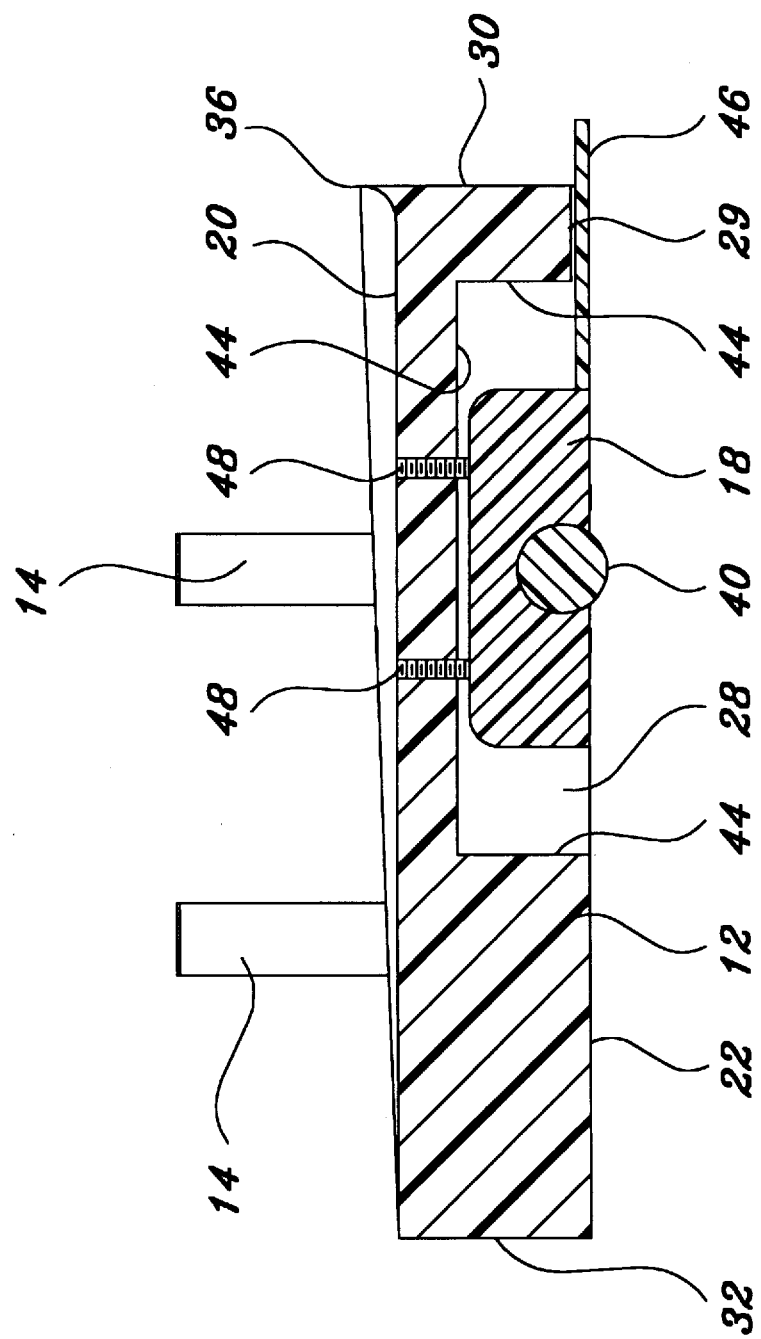
FIG. 12 is a cross section view taken along cut line 12—12' of FIG. 10 of an alternate embodiment of a foot operated computer mouse adaptor with a mouse installed within its cavity.
Figure 13:
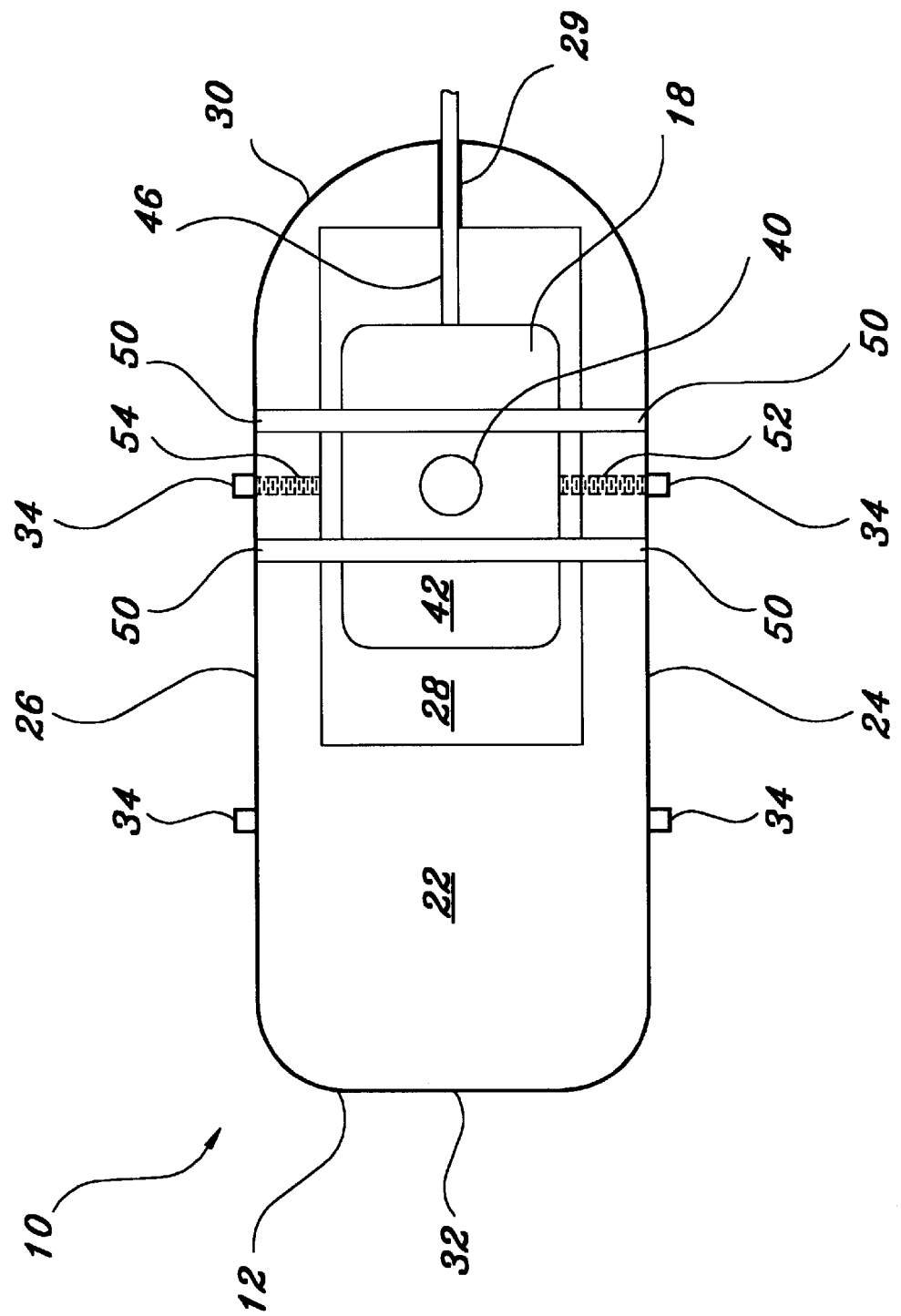
FIG. 13 is a bottom plan view of an alternate embodiment of a foot operated computer mouse adaptor with a mouse installed within its cavity.
Figure 14:
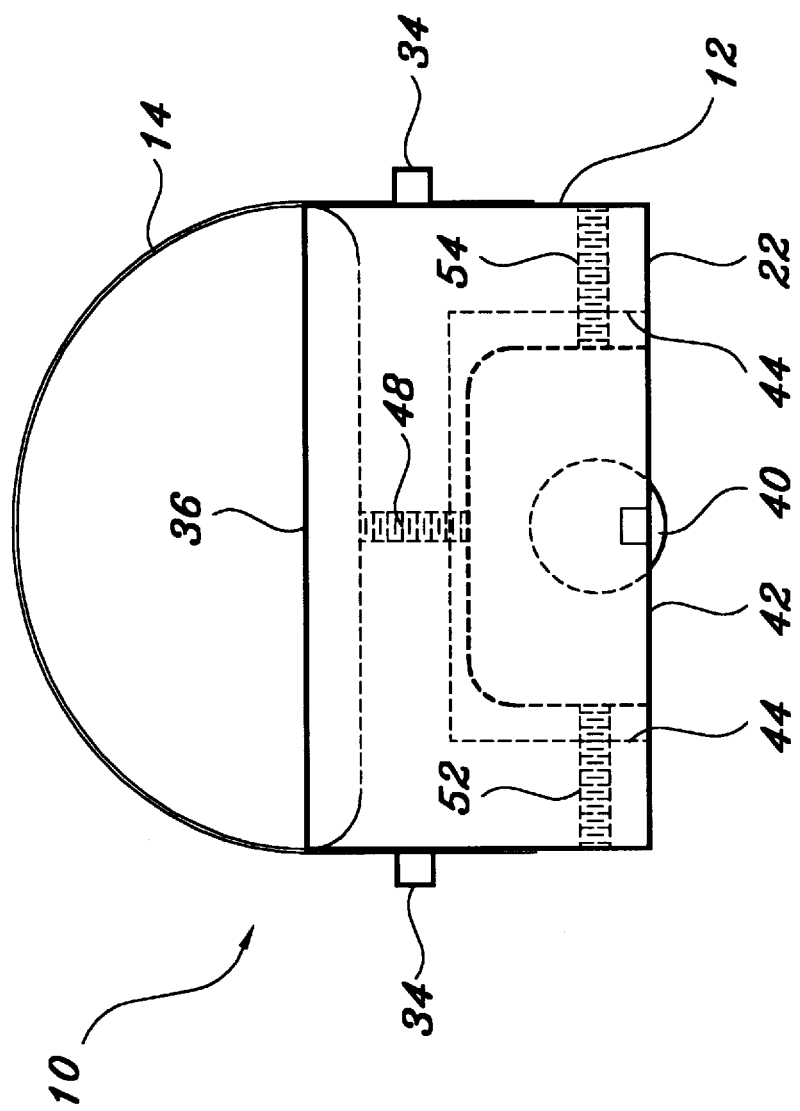
FIG. 14 is a front plan view of an alternate embodiment of a foot operated computer mouse adaptor with the mouse installed within its cavity.

In an alternate embodiment as shown in FIGS. 8–14, the foam inserts 16 are replaced with at least one height adjustment set screw 48, at least one right side set screw 52, at least one left side set screw 54, and one or more bottom straps 50. The set screw 48 is positioned through the top surface 20 of the housing 12 and into the cavity 28. This allows for height adjustment of the mouse 18 within the cavity 28. The right side set screw 52 is positioned through the right side 24 of the housing 12 and into one of the cavity walls 44. The left side set screw 54 is positioned through the left side 26 of the housing 12 and into one of the cavity walls 44 also. The right side set screw 52 and the left side set screw 54 allow for lateral adjustment of the mouse 18 within the cavity 28 and help hold the mouse 18 within the cavity. The bottom straps 50 surround the housing 12 and cover a portion of the cavity 28, the top surface 20, the bottom surface 22, the right side 24, and the left side 26. Assembly of the alternate embodiment requires the computer user to insert the mouse 18 into the cavity 28 as in the preferred embodiment but without the foam inserts 16. Once inserted, the height adjustment set screw 48 is adjusted in order to make the base 42 of the mouse 18 flush with the bottom surface 20 of the housing 12 and allow the rollerball 40, if so equipped, to extend beyond the bottom surface 22. After adjustment, the user tightens the right side set screw 52 and the left side set screw 54 in order to secure the mouse in the cavity 28. Also after adjustment, the user places the bottom straps 50 around the housing 12 thereby covering the base 42 of the mouse 18 and further securing it into the cavity 28. The bottom straps 50 may be of an elastic material that is able to expand around the pegs 34 and housing 12 upon installation. The bottom straps 50 may also take the form of a belt with a keeper that allows the bottom straps 50 to be pulled tightly around the housing 12. Assembly requires that the user does not cover the rollerball 40, if so equipped, of the mouse with any of the bottom straps 50. Once assembled, operation and use is the same as with the preferred embodiment.

Other alternative embodiments may use setscrews with rubberized ends or flaps to hold the mouse 18 within the cavity 28. Further alternative embodiments may have keepers within the cavity 28 in order to hold the mouse 18. This reduces the need for bottom straps 50, foam inserts 16 or set screws and allows the mouse 18 to be snapped into place. Still further alternative embodiments may use a sticky surface or tape within the cavity 28 in order to hold the mouse 18. Other alternative embodiments may place a removable adhesive surface onto the foam insert 16 in order to hold the mouse 18 and securely hold the foam insert 16 into the cavity 28. Still other alternative embodiments may use moveable frictional keepers on the cavity walls 44 which are controlled by levers on the outside of the housing 12. Another alternative embodiment could replace the foam inserts 16 and also hold the mouse 18 within the cavity 28 by means of a series of suction cups within the cavity 28 or with a series of rubber fingers which bend and conform to the surface of the mouse 18. Even further alternative embodiments could attach the foot to the housing 12 by providing an opening on the top surface 20 of the housing which resembles a slip-on shoe. This would allow the user to wear the foot operated computer mouse adaptor 10 much like a normal shoe.

From the foregoing description those skilled in the art will appreciate that all objects of the present invention are realized. A foot operated computer mouse adaptor has been shown and described which permits a computer user to use a computer mouse via the movement of a foot. The adaptor of this invention is capable of allowing a computer mouse to be installed easily within its housing cavity and removed quickly if necessary. The preferred design of the present invention, as well as alterations that will now be apparent to those skilled in the art, all allow use of the foot operated computer mouse adaptor with any conventional computer mouse.

Having described the invention in detail, those skilled in the art will appreciate that modifications may be made of the invention without departing from its spirit. Therefore, it is not intended that the scope of the invention be limited to the specific embodiments illustrated and described. Rather it is intended that the scope of this invention be determined by the appended claims and their equivalents.

What is claimed is:

1. A foot operated computer mouse adaptor for operating a conventional computer mouse having a base, with a computer user's foot comprising:

a housing having a top surface, a bottom surface, a right side, a left side, a front, a back, and a cavity within said bottom surface;

said cavity having one or more walls and sized to substantially surround the conventional computer mouse except for the base of the conventional computer mouse;

a means for holding and positioning the conventional computer mouse within said cavity whereby the base of the computer mouse remains substantially flush with said bottom surface of said housing;

said means for holding and positioning the conventional computer mouse within said cavity comprising one or more foam inserts capable of fitting between said computer mouse and one or more of said walls of said cavity, said one or more foam inserts partially surrounding and contacting said computer mouse except for said base of said computer mouse and contacting and compacting against one or more of said walls of said cavity thereby frictionally holding said mouse within said cavity; and a means for releasably holding the computer user's foot onto said housing whereby the computer user's foot movements correspond to substantially equivalent movements of the computer mouse when said bottom surface of said housing is placed upon a substantially flat surface.

2. A foot operated computer mouse adaptor for operating a conventional computer mouse as defined in claim 1, said means for releasably holding the computer user's foot onto said housing comprising:

a plurality of pegs integrally mounted onto said right side of said housing and said left side of said housing; and one or more top straps containing a plurality of holes, at least one of said holes placed over one or more of said pegs on said left side; and said one or more top straps placed over the computer user's foot with said foot placed upon said top surface of said housing; and at least one of said holes placed over one or more of said pegs on said right side whereby said top straps securely hold the computer user's foot to said top surface of said housing.

3. A foot operated computer mouse adaptor for operating a conventional computer mouse as defined in claim 1, said means for releasably holding the computer user's foot onto said housing comprising:

one or more elastic top straps mounted around said housing and the computer user's foot, said foot placed upon said top surface of said housing, whereby said elastic top straps hold the computer user's foot firmly onto said top surface of said housing.

4. A foot operated computer mouse adaptor for operating a conventional computer mouse as defined in claim 1, further comprising:

a recessed channel on said bottom surface of said housing;

said recessed channel running from said front of said housing to said cavity into which a mouse cord of the computer mouse may be noninterferingly placed.

5. A foot operated computer mouse adaptor for operating a conventional computer mouse having a base, with a computer user's foot comprising:

a housing having a top surface a bottom surface, a right side, a left side, a front, a back, and a cavity within said bottom surface, said cavity having one or more walls and sized to substantially surround the conventional computer mouse except for the base of the conventional computer mouse;

a means for holding and positioning the conventional computer mouse within said cavity whereby the base of the computer mouse remains substantially flush with said bottom surface of said housing;

said means for holding and positioning the conventional computer mouse within said cavity comprising, one or more height adjustment set screws positioned through said top surface of said housing and into said cavity whereby said height adjustment set screw may rest upon said mouse and limit its depth position within said cavity; and one or more right side set screws positioned through said right side of said housing and into said cavity and one or more left side set screws positioned through said left side of said housing and into said cavity whereby said set screws contact and hold the mouse; and a means for releasably holding the computer user's foot onto said housing whereby the computer user's foot movements correspond to substantially equivalent movements of the computer mouse when said bottom surface of said housing is placed upon a substantially flat surface.

6. A foot operated computer mouse adaptor for operating a conventional computer mouse as defined in claim 5, said means for holding and positioning the conventional computer mouse within said cavity further comprising:

one or more bottom straps placed around said housing and said cavity and covering a portion of the base of the computer mouse.

7. A foot operated computer mouse adaptor for operating a conventional computer mouse as defined in claim 5, said means for releasable holding the computer user's foot onto said housing comprising:

a plurality of pegs integrally mounted onto said right side of said housing and said left side of said housing; and one or more top straps containing a plurality of holes, at least one of said holes placed over one or more of said pegs on said left side; and said one or more top straps placed over the computer user's foot with said foot placed upon said top surface of said housing; and at least one of said holes placed over one or more of said pegs on said right side whereby said top straps securely hold the computer user's foot to said top surface of said housing.

8. A foot operated computer mouse adaptor for operating a conventional computer mouse as defined in claim 5, said means for releasable holding the computer user's foot onto said housing comprising:

one or more elastic top straps mounted around said housing and the computer user's foot, said foot placed upon said top surface of said housing whereby said elastic top straps hold the computer user's foot firmly onto said top surface of said housing.

9. A method for operating a conventional computer mouse, having a base, with a computer user's foot, the steps comprising:

providing a housing having a top surface, a bottom surface, a right side, a left side, a front, and a back;

forming a cavity with one or more walls within said bottom surface of said housing capable of substantially surrounding the conventional computer mouse except for said base of said conventional computer mouse;

removably holding the conventional computer mouse within said cavity with the base of the mouse substantially flush with said bottom surface of said housing;

the steps for removably holding the conventional computer mouse within said cavity further comprising, providing one or more foam inserts capable of frictionally fitting between said one or more walls of said cavity and said conventional computer mouse; and inserting one or more of said foam inserts into said cavity to provide proper height spacing whereby the base of the conventional computer mouse is positioned substantially flush with said bottom surface of said housing;

covering the conventional computer mouse except for the base with one or more foam inserts and inserting into said cavity whereby said computer mouse is held within said cavity; and releasable holding the computer user's foot onto said housing; and placing said bottom surface of said housing onto a substantially flat surface and moving the computer user's foot in order to move the base of the conventional computer mouse.

10. A method for operating a conventional computer mouse, having a base, with a computer user's foot, as set forth in claim 9, the steps for releasable holding the computer user's foot onto said housing further comprising:

providing a plurality of pegs and integrally mounting said pegs onto said right side of said housing and said left side of said housing; and providing one or more top straps containing and forming a plurality of holes into said top strap placing at least one of said holes over one or more of said pegs on said left side; and placing the computer user's foot onto said top surface of said housing; and pulling said one or more top straps over the computer user's foot; and placing at least one of said holes over one or more of said pegs on said right side.

11. A method for operating a conventional computer mouse, having a base, with a computer user's foot, as set forth in claim 9, the steps for releasable holding the computer user's foot onto said housing further comprising:

providing one or more elastic top straps;

placing the computer user's foot onto said top surface of said housing; and stretching said straps around said housing and the computer user's foot; and releasing said straps whereby said straps hold the computer user's foot onto said top surface of said housing.

12. A method for operating a conventional computer mouse, having a base, with a computer user's foot, as set forth in claim 9, the steps further comprising:

forming a recessed channel within said bottom surface of said housing; and placing a computer mouse cord within said channel whereby the computer mouse cord does not interfere with the method of operation of the mouse.

13. A method for operating a conventional computer mouse, having a base with a computer user's foot, the steps comprising:

providing a housing having a top surface, a bottom surface, a right side, a left side, a front, and a back;

forming a cavity with one or more walls within said bottom surface of said housing capable of substantially surrounding the conventional computer mouse except for said base of said conventional computer mouse;

removably holding the conventional computer mouse within said cavity with the base of the mouse substantially flush with said bottom surface of said housing;

the steps for removably holding the conventional computer mouse within said cavity further comprising, inserting one or more height adjustment set screws through said top surface of said housing and into said cavity;

adjusting said one or more height adjustment set screws whereby said height adjustment set screw may position said mouse and control its depth within said cavity; and inserting one or more right side set screws through said right side of said housing and into said cavity; and inserting one or more left side set screws through said left side of said housing and into said cavity; and inserting the mouse within said cavity; and adjusting said right and left side set screws to position and hold the conventional computer mouse; and releasable holding the computer user's foot onto said housing; and placing said bottom surface of said housing onto a substantially flat surface and moving the computer user's foot in order to move the base of the conventional computer mouse.

14. A method for operating a conventional computer mouse, having a base, with a computer user's foot, as set forth in claim 13, the steps for removably holding the conventional computer mouse within said cavity further comprising:

surrounding said housing and the base of the mouse with bottom straps.

15. A method for operating a conventional computer mouse having a base with a computer user's foot, as set forth in claim 13, the steps for releasable holding the computer user's foot onto said housing further comprising:

providing a plurality of pegs and integrally mounting said pegs onto said right side of said housing and said left side of said housing; and providing one or more top straps containing and forming a plurality of holes into said top strap placing at least one of said holes over one or more of said pegs on said left side; and placing the computer user's foot onto said top surface of said housing; and pulling said one or more top straps over the computer user's foot; and placing at least one of said holes over one or more of said pegs on said right side.

16. A method for operating a conventional computer mouse, having a base, with a computer user's foot, as set forth in claim 13 the steps for releasable holding the computer user's foot onto said housing further comprising:

providing one or more elastic top straps;

placing the computer user's foot onto said top surface of said housing; and stretching said straps around said housing and the computer user's foot: and releasing said straps whereby said straps hold the computer user's foot onto said top surface of said housing.

* * * * *